United States Patent
Baumgarten

(10) Patent No.: US 8,302,807 B2
(45) Date of Patent: Nov. 6, 2012

(54) FITTING PART FOR FASTENING TO A BOILING OR FRYING VESSEL

(75) Inventor: Rolf-Günter Baumgarten, Neunkirchen (DE)

(73) Assignee: Heinrich Baumgarten KG Spezialfabrik für Beschlagteile, Neunkirchen (DE)

( * ) Notice: Subject to any disclaimer, the term of this patent is extended or adjusted under 35 U.S.C. 154(b) by 177 days.

(21) Appl. No.: 12/864,213

(22) PCT Filed: Jan. 21, 2009

(86) PCT No.: PCT/EP2009/050671
§ 371 (c)(1),
(2), (4) Date: Oct. 18, 2010

(87) PCT Pub. No.: WO2009/092741
PCT Pub. Date: Jul. 30, 2009

(65) Prior Publication Data
US 2011/0024436 A1 Feb. 3, 2011

(30) Foreign Application Priority Data
Jan. 22, 2008 (DE) .......................... 10 2008 005 567

(51) Int. Cl.
*B65D 25/10* (2006.01)
*B65D 53/00* (2006.01)
*B65D 81/24* (2006.01)

(52) U.S. Cl. ..................... 220/759; 220/573.1; 220/912; 16/425

(58) Field of Classification Search ............... 220/573.1, 220/752, 759, 762, 912; 16/442, 425
See application file for complete search history.

(56) References Cited

U.S. PATENT DOCUMENTS

| | | | |
|---|---|---|---|
| 5,887,751 A | 3/1999 | Kroscher | |
| 6,079,590 A * | 6/2000 | Munari | 220/762 |
| 6,250,493 B1 * | 6/2001 | Kwan | 220/759 |
| 6,719,531 B2 | 4/2004 | Wu | |

FOREIGN PATENT DOCUMENTS

| | | |
|---|---|---|
| CH | 509 795 | 7/1971 |
| DE | 2010661 | 3/1970 |
| DE | 20 2006 014 409 U1 | 3/2007 |
| EP | 0 209 461 | 7/1976 |
| GB | 1 262 434 | 2/1972 |

OTHER PUBLICATIONS

International Search Report issued in corresponding application PCT/EP2009/050671, completed Mar. 21, 2009 and mailed Apr. 9, 2009.

* cited by examiner

*Primary Examiner* — Harry Grosso
(74) *Attorney, Agent, or Firm* — Griffin & Szipl, P.C.

(57) ABSTRACT

A fitting part includes a support part fastenable to the vessel wall of a boiling or frying vessel and comprises a grip part fastenable to the support part and fixed with a latching device, and a manual actuation element provided on the latching device for unlatching the latching device from a latched position, wherein a latching nib is provided on the support part and is gripped from behind by a complementarily formed latching projection of the grip part during downwardly direction tilting motion and fixes the grip part in position on the support part, wherein a motion guide element with a motion guide surface is provided on the actuation element, and the motion guide surface inclines at an acute angle obliquely against a linear travel path and glides on the contact area when the actuation element is displaced along the travel path.

10 Claims, 2 Drawing Sheets

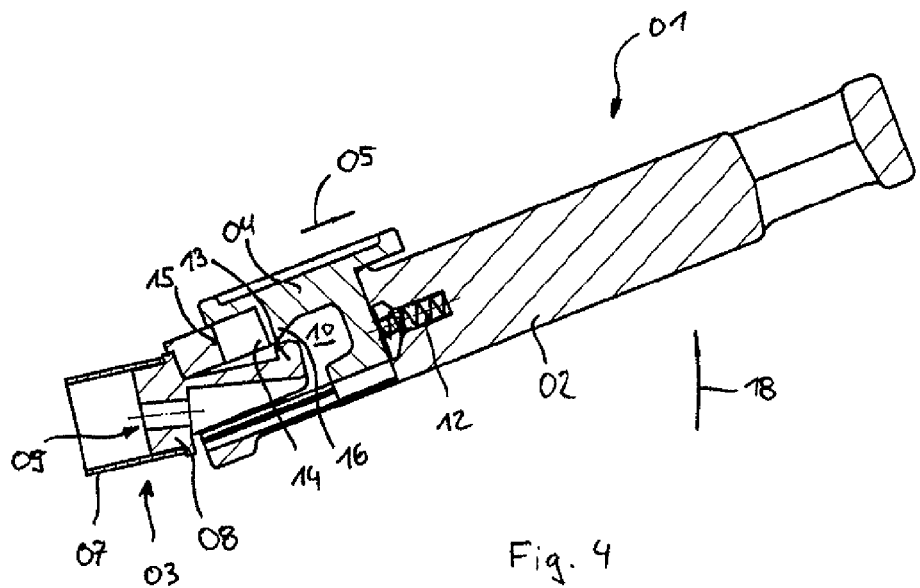
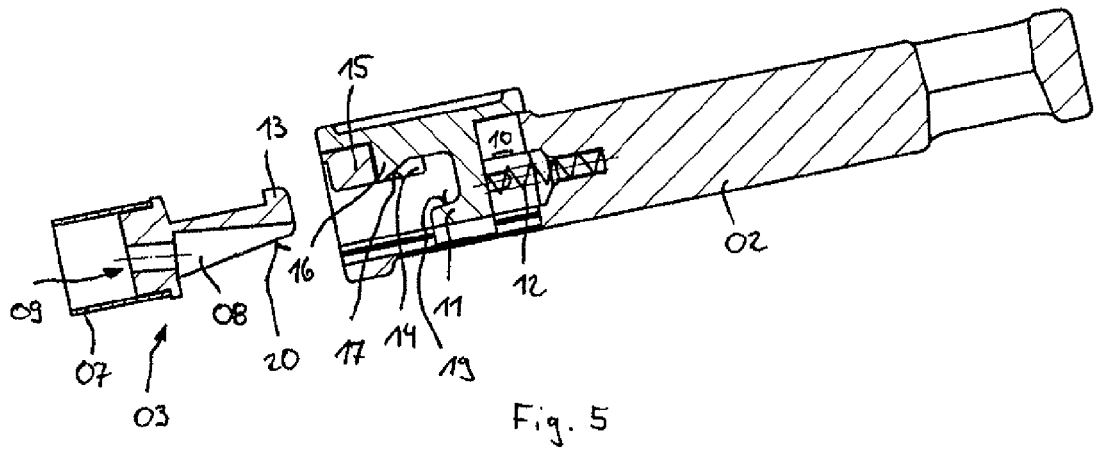

FITTING PART FOR FASTENING TO A BOILING OR FRYING VESSEL

This is a National Phase Application in the United States of International Patent Application No. PCT/EP2009/050671 filed Jan. 21, 2009, which claims priority on German Patent Application No. 10 2008 005 567.0, filed Jan. 22, 2008. The entire disclosures of the above patent applications are hereby incorporated by reference.

FIELD OF THE INVENTION

The invention relates to a fitting part for fastening to a boiling or frying vessel.

BACKGROUND OF THE INVENTION

A generic fitting part is known, for example, from the DE 20 2006 014 4C9 U1. These known fitting parts are used, for example, for fastening a detachable stem grip or other hand grip to a boiling or frying vessel. The fitting part is designed at least as a two-part item, wherein the first part, i.e. the support part, is fixedly connected with the vessel wall of the boiling or frying vessel. The second part of the fitting part, i.e. the grip part, is detachably fastened to this support part thereby allowing the grip part to be optionally removed by the user. The grip part may, for example, be designed as a short hand grip or, in particular, as an elongated stem grip.

Fixing the grip part on the support part is effected, on generic fitting parts, in that the grip part is initially brought into engagement on the support part in an obliquely upward direction and then fixed in its position of use by a downwardly directed tilting motion. Due to this tilting motion fastening elements correspondingly provided on the support part or the grip part can be brought detachably into engagement with each other. In order to reliably preclude an unwanted detachment of the grip part from the support part, the generic fitting parts are provided with a latching device. The latching device is designed such that it latches due to the downwardly directed tilting motion, in particular automatically, thereby securing the grip part in a formed fit on the support part against tilting back. In other words, this means that the grip part cannot be tilted back in an upward direction, when the latching device has latched and therefore cannot be detached from the support part. In order to be able to detach the grip part again at a later stage, an actuation element is provided on the latching device with which the latching device can be unlatched from its latched position. After the latching device has been unlatched the grip part can then be tilted again in an upward direction by the user and thereby detached from the support part.

Therefore, in principle, generic fitting parts require a two-part operating motion for removing the grip part. In the first part of the operating motion the operator initially must unlatch the latching device by actuating the actuation element, in order to then tilt the grip part upwardly in the second part of the operating motion and remove it. This two-part operating motion makes it more difficult to intuitively understand the function of the fitting part during removal of the grip part from the support part. If in order to unlatch the latching device, the actuation element, for example, has to be withdrawn in direction of the longitudinal axis of a stem grip, the user would intuitively expect that the stem grip, after withdrawing the actuating element, can be removed in the direction of its longitudinal axis. Removing the grip part by withdrawing it in direction of the longitudinal axis, however, is not possible due to the generic fixing of the grip part on the support part, since this fixing can be undone only by tilting the support part back in an upward direction.

Based on this state of the art it is therefore the requirement of the invention to propose a new fitting part which improves the intuitive operative understanding during releasing the connection between grip part and support part.

SUMMARY OF THE INVENTION

This requirement is met by a fitting part (01), according to a first embodiment of the invention, for fastening to a boiling or frying vessel, wherein the fitting part includes: a support part (03) that can be fastened to the vessel wall of the boiling or frying vessel and comprising a grip part (02), which can be detachably fastened to the support part (03) and fixed with a latching device (11), wherein the grip part (02), for fastening to the support part (03), is brought into engagement in an obliquely upward direction on the support part (03) and is fixed in its position of use by a downward tilting motion, and wherein the latching device (11) latches as a result of the downwardly directed tilting motion, in particular automatically, and secures the grip part (02) on the support part (03) through a formed fit against tilting back, and wherein a manual actuation element (04) is provided on the latching device (11) for unlatching the latching device (11) from its latched position thereof when the grip part (02) is released, and wherein the grip part (02) can be tilted back obliquely upwards and removed from the support part (03) after the unlatching of the latching device (11), wherein the fitting part is further characterised in that a latching nib (13) is provided on the support part (03), which latching nib is fixingly gripped from behind in a formed bit by a complementarily formed latching projection (14) of the grip part (02) during the downwardly direction tilting motion and fixes the grip part (02) in its position of use on the support part (03), wherein a motion guide element (16) with a motion guide surface (17) is provided on the actuation element (04), which comes to rest against a contact area of the latching nib (13) when the latching device (11) unlatches, and wherein the motion guide surface (17) is inclined at an acute angle obliquely against the linear travel path of the actuation element (04), and wherein the motion guide surface (17) glides on the contact area of the latching nib (13) when the actuation element (04) is displaced along the travel path thereby causing an obliquely upwardly directed back-tilting of the grip part (02).

Advantageous additional embodiments of the invention are summarized as follows. In accordance with a second embodiment of the present invention, the first embodiment is modified so that the actuation element (04) is axially displaceably mounted along a linear travel path for actuating the latching device (11). In accordance with a third embodiment of the present invention, the second embodiment is further modified so that the linear travel path of the actuation element (04) extends in parallel to the longitudinal axis (06) of the grip part (02).

In accordance with a fourth embodiment of the present invention, the first embodiment, the second embodiment, and the third embodiment are further modified so that the latching device (11) is pretensioned with a spring element (12), wherein the latching device (11) is held in a latched end position by the pretensioned spring element (12). In accordance with a fifth embodiment of the present invention, the first embodiment, the second embodiment, the third embodiment, and the fourth embodiment are further modified so that the latched end position of the latching device (11) is closer to the support part (03) than the unlatched end position of the latching device (11). In accordance with a sixth embodiment of the present invention, the first embodiment, the second embodiment, the third embodiment, the fourth embodiment, and the fifth embodiment are further modified so that a seating area (19) is provided on the latching device (11), which comes to rest against a contact area (20) of the support part (03) when the latching device (11) latches, wherein the seating area (19) is inclined at an acute angle obliquely against the linear travel path of the actuation element (04) and is pressed without play against the contact area (20) of the support part (03) by the spring force of the spring element (12).

In accordance with a seventh embodiment of the present invention, the first embodiment, the second embodiment, the third embodiment, the fourth embodiment, the fifth embodiment, and the sixth embodiment are further modified so that the actuation element (04) and the latching device (11) are connected with each other in one piece. In accordance with an eighth embodiment of the present invention, the first embodiment, the second embodiment, the third embodiment, the fourth embodiment, the fifth embodiment, the sixth embodiment, and the seventh embodiment, are further modified so that the actuation element (04) and/or the latching device (11) are manufactured from plastic, in particular from a thermoplastic material.

In accordance with a ninth embodiment of the present invention, the first embodiment, the second embodiment and the third embodiment are further modified so that the grip part (02) is shaped in the manner of a stem grip. In accordance with a tenth embodiment of the present invention, a boiling or frying vessel for the preparation of food is provided, wherein a fitting part (01) according to one of the first embodiment, the second embodiment, the third embodiment, the fourth embodiment, the fifth embodiment, the sixth embodiment, the seventh embodiment, the eighth embodiment, or the ninth embodiment, is attached to one side of the vessel wall of the boiling or frying vessel.

The fitting part according to the invention is based on the basic thought that there is provided, on the actuation element and/or on the latching device, a motion guide element, which is engaged during the unlatching motion of the latching device on the support part. The constructive shaping of the motion guide element can, in principle, be any shape as long as the motion guide element and the support part interact as they engage with each other in such a way that the unlatching motion of the latching device causes the grip part to be tilted back obliquely in an upward direction, whereby supporting the back-tilting motion and/or mutually necessitating the back-tilting motion of the grip part and supporting the unlatching motion of the latching device, in terms of the invention, are also to be regarded as causing this. In other words this means that the two parts of the operating motion for releasing the grip part from the support part, i.e. the unlatching motion and the back-tilting motion, are coupled with each other by means of the motion guide element. When the user performs the unlatching motion which is connected with the displacement of the actuation element or the latching device, a corresponding cinematic coupling via the motion guide element, of necessity, causes an upwardly directed back-tilting. It is quite feasible that the unlatching motion, starting from the latched end position, can initially, for a certain distance, be performed without resistance and that the motion guide element does not engage with the support part until a certain travel path has been overcome. The complete displacement of the latching device into the unlatched end position, however, is, in principle according to the invention, possible only if the grip part is tilted back in an upward direction at the same time. Due to this coupling of the two parts of the operating motion the user is supported to intuitively perform both portions of the motion consecutively or simultaneously.

According to the invention, a latching nib is provided on the support part which can be fixingly engaged in a formed fit from behind by a latching projection of the grip part. With this arrangement the latching nib may be pointing upwards, for example, so that the latching projection of the grip part can be brought into engagement in a formed fit with the latching nib by the downwardly directed tilting motion. The latching device may be designed in such a way that it latches into the underside of the latching nib thus preventing a tilting back. The motion guide for coupling the unlatching motion with the back-tilting motion is realised, according to the invention, by a motion guide surface inclined at an acute angle obliquely against the linear travel path of the actuating element. Due to the oblique incline of the motion guide surface which comes to rest against a contact area of the support part, in particular on the latching nib, it is ensured that when the actuating element is displaced along the linear travel path, the motion guide surface and thus the grip part is pressed upwards and the grip part is therefore tilted back.

In order to enable the user to operate the latching device in an intuitively easily understandable way during unlatching it is particularly advantageous if the latching device can be axially displaced along a linear travel path. To this end the actuation element may be shaped as a kind of sliding knob, for example, which is displaced in longitudinal direction of the grip part.

In order to prevent an unwanted unlatching of the latching device it is particularly advantageous if the latching device is pre-tensioned by a spring element.

The latched end position of the latching device should preferably be closer to the support part and thus closer to the boiling vessel than the unlatched end position. In this way it is ensured that, for unlatching the latching device, an unlatching motion is required which is directed away from the support part and thus away from the boiling vessel, which makes intuitive usage easier.

After the grip part has been fixed on the support part and the latching device has latched, a virtually no-play seat of the grip part should be ensured. In order to ensure this, a seating area may be provided on the latching device which comes to rest against a contact area of the support part during latching of the latching device. Again the seating area can be inclined at an acute angle obliquely against the linear travel path of the actuation element. If the seating area, after the latching device has latched, is pressed against the contact area of the support part, the movement of play between seating area and contact area, due to the oblique positioning of the seating area, becomes increasingly smaller as the latching device is pressed further in direction of its latched end position. In this way it is ensured, in the end, that the seat of the grip part on the support part is without play.

In order to ensure a simple and cost-effective manufacture of the fitting part, it is particularly advantageous to connect the actuation element and the latching device so as to form one piece. This may be done in a particularly simple way by manufacturing the actuation element and the latching device from a plastic, for example from a thermoplastic material, by injection-moulding. If a spring element is provided for pre-tensioning the latching device, the entire functionality of the actuation element and in particular of the motion guide element may be realised by two components, i.e. the actuation element with latching device injection-moulded in one piece from a plastic, and the spring element available as an additional part at a favourable price.

The grip part may, in principle, be constructed at random. However, of especially high importance are respective fitting parts for attaching stem grips on frying pans.

The fitting part according to the invention offers particularly large advantages, if one fitting part only is attached with a grip part to the respective boiling or frying vessel on one side only. This corresponds, for example, to the construction of frying pans with a stem grip. With such cooking utensils with one grip part only an additional safeguard against the unwanted release of the grip part, while lifting the boiling or frying vessel, is realised by the motion guide element according to the invention. For the intrinsic weight of the boiling or frying vessel acts against the back-tilting motion of the grip part. Thus, as a result, it is not possible for the user to unlatch the latching device while lifting the boiling or frying vessel, as otherwise, the entire weight of the boiling or frying vessel would have to be lifted due to the unlatching motion. Only after the boiling or frying vessel has been set down, the single grip on the vessel can be tilted back due to the corresponding easing of the load.

BRIEF DESCRIPTION OF THE INVENTION

One embodiment of the invention is schematically illustrated in the drawings and will now be explained with reference to the same by way of example, of which:

FIG. 4 shows the fitting part of FIG. 2 during removal of the grip part from the support part; and FIG. 5 shows the fitting part of FIG. 2 after removal of the grip part from the support part.

DETAILED DESCRIPTION OF THE INVENTION

Figure 1:
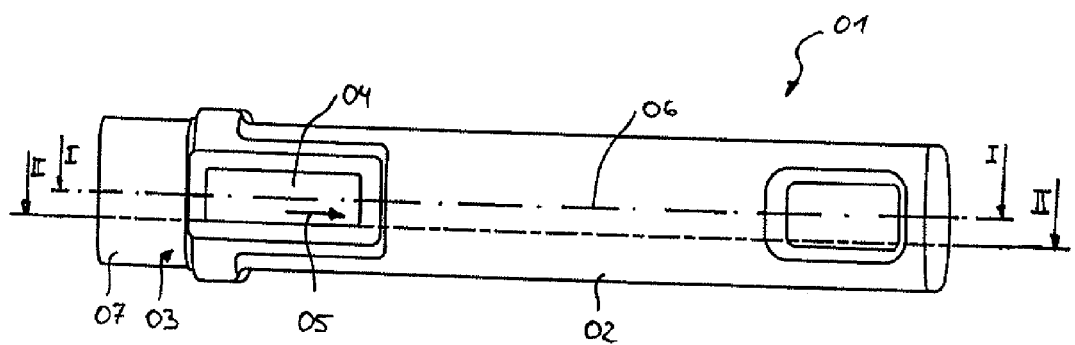
FIG. 1 shows a top view of a fitting part with grip part and support part.

FIG. 1 shows a top view of a fitting part 01. The fitting part 01 comprises a grip part 02, which in the example shown is shaped in the manner of a stem grip for a frying pan. Further the fitting part 01 comprises a support part 03, which with its free end is fastened to the vessel wall of a boiling or frying vessel not shown. The grip part is detachably connected with the support part 03, in order to be able to remove the grip part 02 after fastening the support part 03 on the vessel wall of the boiling or frying vessel. On the top side of the grip part 02 an actuation element 04 is additionally provided which is mounted so as to be axially movable in direction of the motion arrow 05, i.e. in direction of the longitudinal axis 06 of the grip part 02 along a linear travel path.

Figure 2:
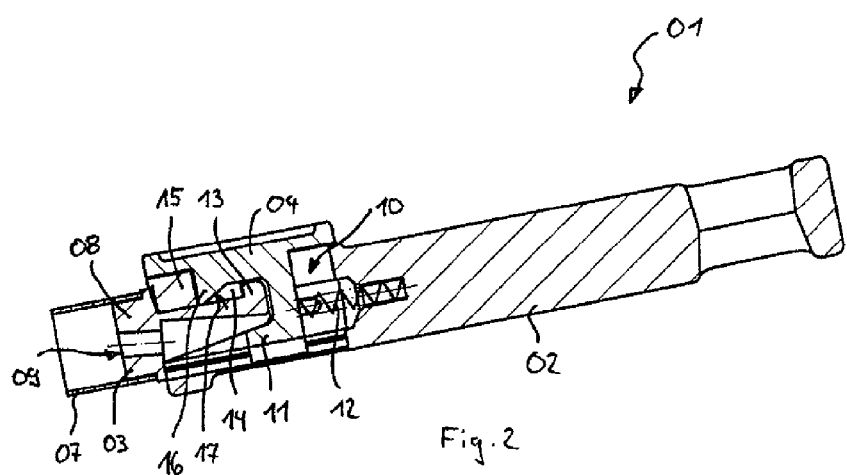
FIG. 2 shows a longitudinal section along cutting line I-I of the fitting part according to FIG. 1.
Figure 3:
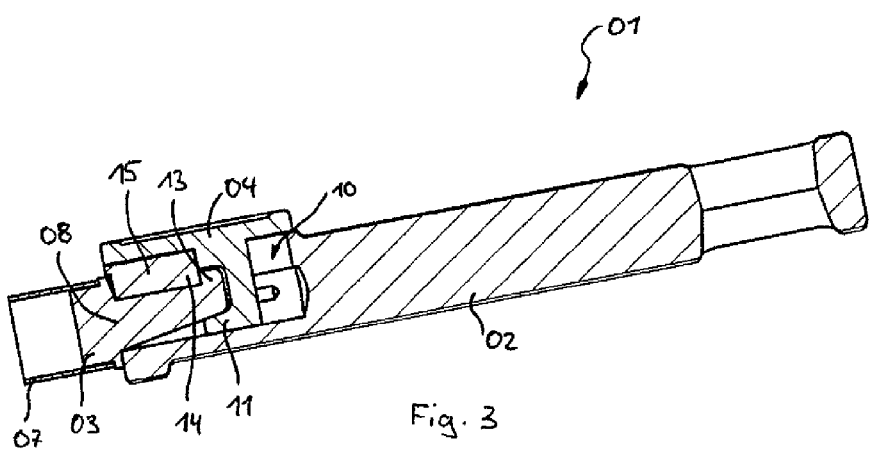
FIG. 3 shows a longitudinal section along cutting line II-II of the fitting part according to FIG. 1.

FIG. 2 and FIG. 3 show the fitting part 01 in a longitudinal section along cutting line I-I, i.e. in a section along the longitudinal axis 06 (FIG. 2) and in a longitudinal section along cutting line II-II. It can be recognised that the support part 02 consists of a sleeve 07 and a fastening part 08, whereby the fastening part 08 can be screwed to the vessel wall of a boiling or frying vessel by means of a fastening screw. The fastening screw passes through a recess 09 in the fastening part 08 and tensions the fastening part 08 and the sleeve 07 against the outside of the vessel wall.

On its top side the grip part 02 has a recess 10 through which passes the actuation element 04 into the interior of the grip part 02. On its inside the actuation element 04 is connected in one piece with a latching device 11 so that the latching device 11 can be axially displaced by axially displacing the actuation element 04 between its final latched position shown in FIG. 2 and its final unlatched position shown in FIG. 4. The latching device 11 is elastically pre-tensioned by means of a spring element 12 and is pressed into its forward position by the force of the spring.

A latching nib 13 on the fastening part 08 of the support part 03 is used to fix the grip part 02 in its position of use. As can be seen, in particular, in the longitudinal section in FIG. 3, this latching nib 13 can be gripped from behind in a formed fit by a latching projection 14 of the grip part 02. The latching projection 14 is formed by the bottom edge of a web 15 which limits the recess 10 on the grip part 02 towards the front.

When during fastening the grip part 02 on the support part 03, the grip part 02 is tilted downward into its position of use shown in FIG. 2 and FIG. 3, fixing the grip part 02 is ensured by the latching projection 14 on the latching nib 13 gripping behind it in a formed fit. Further, in order to reliably preclude an unwanted renewed release of the grip part 02 from the support part 03, the latching device 11, driven by the spring force 12, latches over the face of the latching nib 13 so that the grip part 02 can no longer be tilted back in an upward direction.

As can be seen in FIG. 2, the web 15 in the area of its centre has a lesser depth so that in this central area no latching projection 14 is formed which engages on the latching nib 13. In this recess formed by the lesser depth of web 15 a motion guide element 16 is received, which is moulded in one piece on the actuation element 04 or on the latching device 11.

The motion guide element 16 has an obliquely inclined motion guide surface 17 in relation to the longitudinal axis 06, which when the actuation element 04 is withdrawn, comes to rest against a contact area of the latching nib 13.

FIG. 4 shows the interaction of the motion guide element 16 with the latching nib 13 when the grip part 02 is released from the support part 03. When the actuation element 04 is withdrawn from its latched end position shown in FIG. 2 in direction of the motion arrow 05, the latching device 11 unlatches for a certain distance, and an upwardly directed back-tilting motion in direction of the motion arrow 18 is made possible. In order for the user to intuitively recognise the required motion direction in direction of the motion arrow 18, the motion guide surface 17 interacts with the contact area of the latching nib 13. For due to the oblique positioning of the motion guide surface 17 the actuation element 04 can be pressed into its final unlatched position shown in FIG. 4 only if at the same time the grip part 02 is upwardly tilted back in direction of the motion arrow 18. This is directly haptically recognisable for the user and thus allows a simple and intuitive use of the fitting part 01 during removal of the grip part 02.

FIG. 5 shows the fitting part 01 with the grip part 02 detached, wherein the latching device has been pressed back again into the forward position due to the spring force of spring element 12. One recognises the web 15 with one of the two latching projections 14, between which the motion guide element 16 is axially movably mounted. A seating area 19 on the latching device 11 is used to ensure a no-play seat of the grip part 02 on the support part 03. To this end the seating area 19, during latching of the latching device 11, is pressed by the spring element 12 against the contact area 20 also obliquely inclined towards the longitudinal axis 06.

The invention claimed is:

1. A fitting part for fastening to a boiling or frying vessel, the fitting part comprising:
   a support part that can be fastened to the vessel wall of the boiling or frying vessel and comprising a grip part, wherein the grip part can be detachably fastened to the support part and fixed with a latching device, wherein the grip part, for fastening to the support part, is brought into engagement in an obliquely upward direction on the support part and is fixed in a position of use by a downward tilting motion, and wherein the latching device latches automatically as a result of the downwardly directed tilting motion, and secures the grip part on the support part through a formed fit against tilting back, and wherein a manual actuation element is provided on the latching device for unlatching the latching device from a latched position thereof when the grip part is released, and wherein the grip part can be tilted back obliquely upwards and removed from the support part after the unlatching of the latching device,
wherein a latching nib is provided on the support part, wherein the latching nib is fixingly gripped from behind in a formed bit by a complementarily formed latching projection of the grip part during the downwardly direction tilting motion and fixes the grip part in the position of use on the support part, wherein a motion guide element with a motion guide surface is provided on the actuation element, wherein the actuation element comes to rest against a contact area of the latching nib when the latching device unlatches, and wherein the motion guide surface is inclined at an acute angle obliquely against the linear travel path of the actuation element, and wherein the motion guide surface glides on the contact area of the latching nib when the actuation element is displaced along the travel path thereby causing an obliquely upwardly directed back-tilting of the grip part.

2. A fitting part according to claim 1, wherein the linear travel path of the actuation element extends in parallel to the longitudinal axis of the grip part.

3. A fitting part according to claim 1, wherein the latching device is pretensioned with a spring element, wherein the latching device is held in a latched end position by the pretensioned spring element.

4. A fitting part according to claim 1, wherein the latched end position of the latching device is closer to the support part than the unlatched end position of the latching device.

5. A fitting part according to claim 1, wherein a seating area is provided on the latching device, wherein the seating element comes to rest against a contact area of the support part when the latching device latches, wherein the seating area is inclined at an acute angle obliquely against the linear travel path of the actuation element and is pressed without play against the contact area of the support part by the spring force of the spring element.

6. A fitting part according to claim 1, wherein the actuation element and the latching device are connected with each other in one piece.

7. A fitting part according to claim 1, wherein the actuation element, or the latching device, or the actuation element and the latching device, are manufactured from a thermoplastic material.

8. A fitting part according to claim 1, wherein the grip part is shaped in the manner of a stem grip.

9. A boiling or frying vessel for the preparation of food, wherein the fitting part according to claim 1 is attached to one side of a vessel wall of the boiling or frying vessel.

10. A fitting part according to claim 2, wherein the latching device is pretensioned with a spring element, wherein the latching device is held in a latched end position by the pretensioned spring element.

* * * * *